(12) United States Patent
Pavlik, Jr. et al.

(10) Patent No.: US 6,574,991 B1
(45) Date of Patent: Jun. 10, 2003

(54) PURE FUSED SILICA, FURNACE AND METHOD

(75) Inventors: Robert S. Pavlik, Jr., Corning, NY (US); Lawrence H. Kotacska, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/658,200

(22) Filed: Sep. 8, 2000

Related U.S. Application Data

(63) Continuation-in-part of application No. 09/125,208, filed on Aug. 13, 1998, now Pat. No. 6,174,509.
(60) Provisional application No. 60/153,422, filed on Sep. 10, 1999.

(51) Int. Cl.[7] ............................ C03B 5/14; C03B 5/43
(52) U.S. Cl. ................ 65/27; 65/168; 65/171; 65/173; 65/413; 65/414; 65/421; 65/374.13; 432/264; 432/265; 110/336; 110/338
(58) Field of Search ............................ 65/27, 168, 171, 65/173, 413, 414, 421, 374.13; 432/264, 265; 110/336, 338

(56) References Cited

U.S. PATENT DOCUMENTS

| | | | |
|---|---|---|---|
| 2,239,551 A | 4/1941 | Dalton et al. .................. | 49/79 |
| 2,272,342 A | 2/1942 | Hyde ......................... | 49/78.1 |
| 3,698,936 A | 10/1972 | Moltzan .................. | 117/105.2 |

(List continued on next page.)

FOREIGN PATENT DOCUMENTS

| | | | |
|---|---|---|---|
| CA | 936790 | 11/1973 | ................... 148/1 |
| JP | 54-160414 | 12/1979 | |
| JP | 10-7476 | 1/1998 | ........... C04B/41/80 |
| JP | 10-167735 | 6/1998 | ............. C03B/8/04 |
| JP | 10-194765 | 7/1998 | ........... C03B/20/00 |

OTHER PUBLICATIONS

P. T. Shaffer, Materials Index, No. 1, Plenum Press Hanbooks of Hig–Temperature Materials, 1964, pp. 308–408.
P.H. Ribbe, Ortho–Silicates, Reviews in Mineralogy, No. 5, 1980, pp. 189–215.
Robert F. Davis and Joseph A. Pask, High Temperature Oxides, Part IV, Refractory Glasses, Glass–Ceramics, and Ceramics, Mullite, 1971, pp. 37–76.
W. E. Cameron et al., Fibrolite and its Relationship to Sillimanite, Nature Physical Science, vol. 235, Feb. 14, 1972, pp. 134–136.
F.M.Ernsberger, Journal of the American Ceramic Society, Discussions and Notes, vol. 52, No. 5, 1969, p. 292.
Robert F. Davis et al., Decomposition of Mullite, Inorganic Materials Research Div., Lawrence Berkleey Laboratroy, and Dept. of Materials Science and Engineering, Univ. of Claif., Berkeley, Calif. 1972, pp. 98–101.
C.H. Lee et al., Low–Activation Energy Conduction in Polycrystalline $\alpha$–$Al_2O_3$ Doped with Si and Na, I. Am. Ceram. Soc., 68 (2), Dept. of Materials Science, Univ. of S. Calif, Los Angeles, Calif. 1985, pp. 71–73.
Shin–Ichi Iwai et al., Decomposition of Mullite by Silica Volatilization, Journal of the American Ceramic Society, vol. 63, No. 1–2, 1980, pp. 44–46.

(List continued on next page.)

*Primary Examiner*—Michael Colaianni
(74) *Attorney, Agent, or Firm*—Edward F. Murphy; Walter M. Douglas

(57) ABSTRACT

An article of relatively pure silica, and a furnace and method of producing the article. The article is produced by collecting molten silica particles in a refractory furnace in which at least a portion of the refractory has been exposed to a halogen-containing gas to react with contaminating metal ions in the refractory.

21 Claims, 5 Drawing Sheets

U.S. PATENT DOCUMENTS

| | | | |
|---|---|---|---|
| 4,213,753 A | * 7/1980 | Negroni et al. | |
| 4,552,576 A | 11/1985 | Hara et al. | 65/2 |
| 4,804,422 A | 2/1989 | Papanikolau et al. | 134/28 |
| 4,828,481 A | * 5/1989 | Weil et al. | |
| 4,859,224 A | 8/1989 | Clasen | 65/17 |
| 4,956,059 A | 9/1990 | Englisch et al. | 204/130 |
| 5,043,002 A | * 8/1991 | Dobbins et al. | |
| 5,124,287 A | 6/1992 | Wehrenberg et al. | 501/106 |
| 5,219,807 A | 6/1993 | Pavlica et al. | 501/132 |
| 5,322,827 A | 6/1994 | Michael et al. | 501/132 |
| 5,332,702 A | 7/1994 | Sempolinski et al. | 501/106 |
| 5,395,413 A | * 3/1995 | Sempolinski et al. | |
| 5,688,477 A | 11/1997 | Nel | 423/82 |
| 5,696,038 A | 12/1997 | Maxon | |
| 5,698,484 A | * 12/1997 | Maxon | |
| 5,951,730 A | 9/1999 | Schermerhorn | 65/17.3 |
| 5,970,751 A | 10/1999 | Maxon et al. | 65/414 |
| 6,077,801 A | 6/2000 | Zanoli et al. | 501/128 |

OTHER PUBLICATIONS

W. M. Kirven et al., Solid Solution Range and Microstructures of Melt–Grown Mullite, Journal of the American Ceramic Society, vol. 66, No. 9, 1983, pp. 649–654.

Isabel K. Lloyd et al., Journal of the American Ceramic Society, vol. 64, No. 12, 1981, pp. 744–747.

Journal of the American Ceramic Society, Discussions and Notes, vol. 52, No. 8, 1969, pp. 454–455.

Istvan Szabo et al., Kinetics of Aluminum Oxide Chlorination. 2. Experiments and Evaluation of Results, Ind. Eng. Chem. Res., 1991, 30, pp. 298–303.

D.E. Herrick et al., Acceleration of Chlorination of Alumina Using Supercritical $CCl_4$, AIChE Journal, Apr. 1988, vol., 34, No. 4, pp. 669–671.

N.A. Goken, Rates of Chlorination of Aluminous Resources, Information Circular 8952, 1983, pp. 1–14.

Xue–Mei Yue et al., Corrosion Behavior of Single–Crystal Alumina in argon, Air, and Water Vapor Atmospheres at 1700–2000° C., J. Am. Ceram. Soc. 82 (9), 1999, pp. 2560–2562.

Ana E. Bohe et al., An Approach to the Intrinsic Kinetics of the Zirconium Oxide Carbochlorination, Ber. Bunsenges. Phys. Chem. 99, No. 12, 1995, pp. 1553–1558.

Herbert H. Kellog, Thermodynamic Relationships in Chlorine Metallurgy, Journal of Metals, Transactions Aime, vol. 188, 1950, pp. 862–872.

W.W. Stephens et al. Chlorination of Zirconium Oxide, Journal of Metals, Transactions Aime, 1952, pp. 733–737.

Martin R. Houchin et al., Production of High–Purity Zirconia from Zircon.

Hosman, Charles, Editor, Handbook of Chemistry & Physics chemical Rubber Co, Cleveland OH 1961 pp. 526–527, 588–589, 592–593, 674–675, 2375–2386.

* cited by examiner

PURE FUSED SILICA, FURNACE AND METHOD

This application is a Continuation-In-Part of U.S. Ser. No. 09/125,208, filed Aug. 13, 1998 now U.S. Pat. No. 6,174,509, entitled Pure Fused Silica, Furnace And Method, of Robert S. Pavlik, Jr., Daniel R. Sempolinski and Michael R. Wasilewski. This application also claims the benefit of priority of U.S. Provisional Application Serial No. 60/153,422, filed Sep. 10, 1999, entitled Crown Refractory Material for Making Fused Silica, of Lawrence H. Kotacska and Robert S. Pavlik, Jr., which are hereby incorporated by reference.

FIELD OF THE INVENTION

An article of relatively pure fused silica, and a furnace and method for producing the article.

BACKGROUND OF THE INVENTION

Relatively pure metal oxides are produced by thermal decomposition of precursors and deposition of the resulting oxides. The precursor may take the form of a vapor, or may be carried by a vapor. It may be decomposed by either flame hydrolysis or pyrolysis.

One such process is production of fused silica by hydrolysis or pyrolysis of silicon tetrachloride. Early patents disclosing such processes for producing silica are U.S. Pat. No. 2,239,551 (Nordberg) and U.S. Pat. No. 2,272,342 (Hyde). A commercial application of flame hydrolysis involves forming and depositing particles of fused silica to form large bodies (boules). Such boules may be used individually, or may be finished and integrated together into large optical bodies, such as telescope mirrors. In this procedure, $SiCl_4$ is hydrolyzed, and the hydrolyzed vapor is passed into a flame to form molten particles of fused silica. The particles are continuously deposited on a bait, or in a crucible, known as a cup, to form a boule.

A serious drawback in this process has been the need to dispose of the HCl by-product in an environmentally safe manner. Accordingly, it has been proposed, in U.S. Pat. No. 5,043,002 (Dobbins et al.), to employ a halide-free, silicon-containing compound as a substitute for $SiCl_4$. In particular, the patent proposes using a polymethylsiloxane, such as octamethylcyclotetrasiloxane, to provide the vaporous reactant for the hydrolysis or pyrolysis process.

In order to introduce a substitute precursor, it is, of course, critically necessary to avoid any significant change in the properties of the fused silica product. Unfortunately, the substitution proposed by the Dobbins et al. patent did lead to significant property changes. One such change was a reduction in UV transmission properties. Another was development of fluorescence in the glass that increased when the glass was exposed to short wavelength radiation.

Studies revealed that a factor in the transmission loss was sodium ion content in the glass. U.S. Pat. Nos. 5,332,702 and 5,395,413 (Sempolinski et al.) describe remedial measures taken to reduce the sodium ion content. Essentially, these measures constituted providing a purer zircon refractory for use in constructing a furnace in which the fused silica was deposited to form a boule. In particular, it was found necessary to use dispersants, binders and water relatively free of sodium ions in producing zircon refractory components for the furnace.

An improved product was obtained by adopting the practices prescribed in the Sempolinski et al. patents. However, use of the fused silica in certain applications made it apparent that further improvements were necessary to meet the critical requirements of these applications. One such application is lenses designed for transmission of very short UV wavelength radiation from an excimer type laser. This laser emits radiation at about 193 nm and 248 nm wavelengths.

It was found that lenses produced from available fused silica did not provide acceptable transmission of the short wavelength radiation and exhibited an undesirable fluorescence. Both of these conditions tend to become worse with service time. The loss of transmission, or darkening of the glass, is commonly referred to as UV absorption damage.

It is a primary purpose of the present invention to provide a fused silica material that alleviates these problems. Another purpose is to provide an improved fused silica glass for lenses used with lasers, especially for microlithographic work. A further purpose is to provide an improved furnace for collection of the fused silica in the form of a boule. A still further purpose is to provide a method of achieving the improved collecting furnace and glass produced therein.

SUMMARY OF THE INVENTION

The invention includes a method of making a fused silica glass. The method includes providing a silica feedstock, and providing a furnace crown and cup consisting essentially of aluminum dioxide, with the crown covering a consolidating non-porous fused silica glass mass. The method further includes delivering the silica feedstock to reaction site burners mounted within the aluminum dioxide crown wherein the silica feedstock is converted into silica particles which are deposited and consolidated into the fused silica glass mass.

The invention further includes a fused silica glass furnace for converting a non-silica fluid silica precursor feedstock into a fused silica glass, the fused silica glass furnace having a contained furnace interior. The contained furnace interior has a maximum furnace operation temperature MFOT. The furnace interior is comprised of a conversion deposition consolidation site where the precursor feedstock is converted into silica soot and the converted silica soot is then deposited and consolidated into a fused silica glass. The furnace interior is contained and insulated by aluminum dioxide refractory bricks with the aluminum dioxide refractory bricks having a fired temperature FT, where FT>1650° C., and the aluminum dioxide refractory bricks consist essentially of Al and O.

An embodiment of the present invention resides in an improved method of producing a fused silica body by introducing a silicon-containing compound into a lame to form molten silica particles and collecting those particles in the form of a fused silica body in a furnace constructed of refractory materials, the improvement comprising constructing at least a portion of the furnace from refractory materials that have been exposed to a reactive, halogen-containing gas to react with and thereby cleanse the refractory of contaminating metals.

A further aspect of the invention resides in a relatively pure fused silica material in which the fused silica has a transmittance value of at least 99.5% for 248 nm radiation, a transmittance value of at least 98% for 193 nm radiation, at least a substantial portion of the body has an acceptable fluorescence level when exposed to such radiation, and the fused silica material has a content of contaminating metal ions less than 100 ppb.

The invention further resides in a refractory furnace for collecting molten silica particles in the form of a solid body, at least a portion of the furnace being constructed of a refractory that contains mobile metal contaminants in an amount less than 300 ppm.

DESCRIPTION OF THE INVENTION

The conventional boule process used in making fused silica is a one-step process. In this process, a carrier gas is bubbled through a $SiCl_4$ feedstock that is maintained at a specified low temperature. The vaporous $SiCl_4$ is entrained in the carrier gas and is thereby transported to the reaction site. The reaction site is comprised of a number of burners that combust and oxidize the vaporous $SiCl_4$ to deposit silica at a temperature greater than 1600° C.

The principal requirements in the conventional process are that the apparatus and transfer system be capable of vaporizing the feedstock and delivering the vaporized feedstock to a burner in the vapor state. As described in the Dobbins et al. patent, the apparatus and process may remain substantially unchanged with one major exception. The $SiCl_4$ feedstock is replaced by a polymethylsiloxane. Use of this substitute feedstock may require some minor adjustments, such as a somewhat higher delivery temperature (e.g., 100–150° C.). This is due to the siloxane having a somewhat lower vapor pressure than $SiCl_4$.

Figure 1:
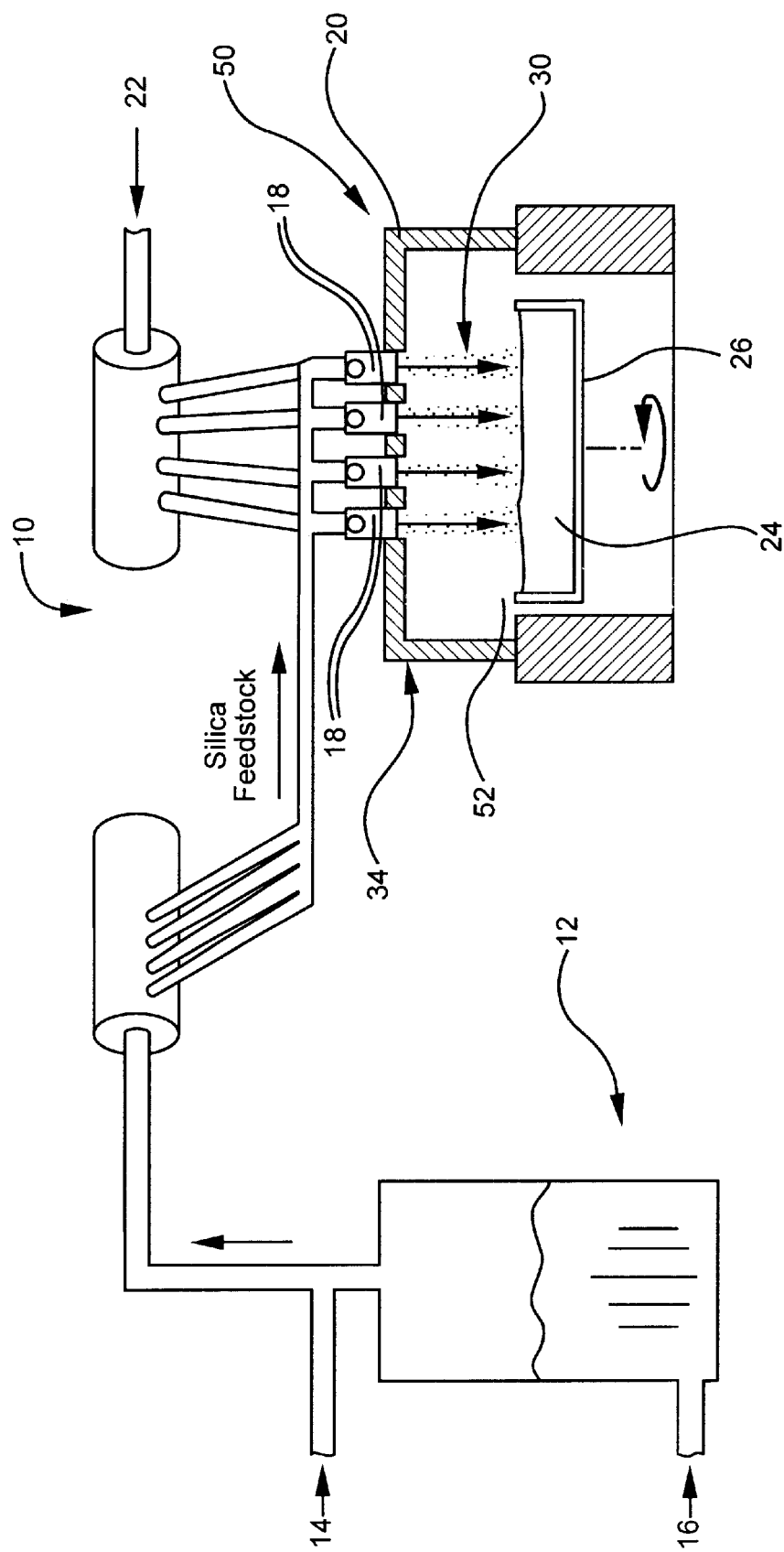
FIG. 1 is a schematic representation of an apparatus and process for making fused silica glass in accordance with the invention.

FIG. 1 in the accompanying drawing is a schematic representation of an apparatus and process for producing and depositing molten silica particles to build up a large, fused silica boule. The apparatus, generally designated by the numeral 10, includes a feedstock source 12. Nitrogen, or a nitrogen/oxygen mixture, is used as the carrier gas. A bypass stream of nitrogen 14 is introduced to prevent saturation of the vaporous stream. The vaporous reactant is passed through a distribution mechanism to the reaction site wherein a number of burners 18 are present in close proximity to a furnace crown 20. The reactant is combined with a fuel/oxygen mixture 22 at these burners, and is combusted and oxidized to deposit silica at a temperature greater than 1600° C. High purity metal oxide soot and heat are directed downwardly through the refractory furnace crown 20. The silica is immediately deposited and consolidated to a non-porous mass 24 on hot cup 26.

Improvement in the zircon refractory, as disclosed in the Sempolinski et al. patents, alleviated the affect of sodium ion contamination in a fused silica article. However, it was then found that other contaminants also exist in the furnace refractory in addition to sodium. These include the alkaline earth metals, and transition metals, such as iron, and lead, phosphorous, sulfur, other alkali, and aluminum, and particularly mobile metal contaminants which degrade UV optical transmission of the glass These metal contaminants have varying degrees of volatility at temperatures in excess of 1650° C., the temperature at which fused silica is deposited. Thus, they may be present in the furnace atmosphere, and become entrapped in the fused silica as it is deposited. The presence of these contaminating metals in a fused silica lens results in a reduction of the transmittance capability of the glass, and also results in development of an undesirable fluorescence in the glass. These deficiencies continue to further develop as the lens is subjected to short wavelength UV radiation in service.

There are inherent variations in the metal impurity levels in a refractory material, as well as varying degrees of metal volatility. This makes it difficult to control glass quality in a fused silica collection furnace, or even to obtain acceptable glass frequently. The problem becomes particularly acute when a polysiloxane is used as a precursor material for the fused silica. As explained in the Sempolinski et al. patents, the self-cleansing action of the HCl by-product from a $SiCl_4$ decomposition is lost with the siloxane precursor.

Contaminating metals can be present in the raw materials employed in production of furnace refractories. The metals may also be entrained during sintering of the refractory, or during any subsequent operations, such as sawing or grinding.

We have found that this degree of contaminating metal control in a collection furnace can be achieved by constructing the furnace of refractory materials containing less than 300 parts per million (ppm) of the contaminating metals. In particular, we have found this to be true for zircon refractories used in a collection furnace for fused silica deposition. This desirable end is accomplished, in accordance with the present invention, by firing the furnace refractories in a halogen-containing atmosphere. The halogen reacts with and removes the contaminating metals from at least the exposed surface of the refractory.

We have found that chlorine or fluorine, alone or in acid gas form, to be especially useful. The cleansing gas can be used in essentially pure form. However, we have found it convenient, and effective, to employ as little as 5% of the cleansing gas in an inert gas, such as helium or argon, with a somewhat longer treatment time. The cleansing treatment may employ a continuous flow of the halogen gas. Alternatively, a pulsed type treatment may be used wherein gas is repeatedly introduced into the firing cleaning chamber and subsequently exhausted.

The cleansing action can occur at a temperature as low as 700° C. However, it is usually preferred to employ somewhat higher temperatures in the range of 1100 to 1500° C.

The invention is here described with reference to treatment of refractory furnace elements.

The cleansing process on a refractory body is preferably carried out prior to assembly into a furnace. The treatment may be carried out during the production of the refractory prior to assembly into a furnace.

The use of refractories chemically cleaned in accordance with the invention provides several advantages. The cleaner deposition furnace provides a fused silica product of high purity. It provides high, consistent yields of fused silica glass having an acceptably high transmission of short wavelength UV radiation and a low level of fluorescence. Further, the glass is less prone to increases in radiation damage and fluorescence in service. These desired ends are achieved without requiring change in, or compromise of, either the furnace design or the silica forming and deposition process. This is highly significant because these features are critical to achievement of refractive index homogeneity in the glass.

The effectiveness of the cleansing treatment was demonstrated by comparing two sets of fused silica test pieces made with zircon refractories. One set was taken from boules deposited in an untreated collection furnace made of zircon refractories. A second set was taken from boules deposited in a treated furnace made of treated zircon refractories. The furnaces were constructed in essentially identical design with sintered zircon refractory crowns and cup liners. The zircon refractories in the treated furnace were soaked for eight hours in a cleansing furnace operating at 1300° C. A flowing atmosphere of 5.7% $Cl_2$ and 94.3% helium was maintained during the entire time.

Relevant properties were measured on the test pieces taken from comparable locations in the boules from the untreated furnace and those from the treated furnace. TABLE I shows internal transmittance in percent as determined on the basis of measurements for both 248 nm and 193 nm wavelength radiation.

TABLE I

|        | Untreated | Treated |
|--------|-----------|---------|
| 248 nm | 99.08     | 99.82   |
|        | 99.46     | 99.85   |
| 193 nm | 95.28     | 99.18   |

The fused silica boules described above were also analyzed to determine the percentage of boule depth that exhibited an acceptable low level of fluorescence. Fluorescence is determined by integrating the intensities measured over the range of 400–700 nm. To be acceptable, a glass test piece must exhibit a value, as so determined, that is below $4.2 \times 10^{-9}$ watts/cm$^2$ when the glass is exposed to an emitting laser operating at 15 mJ/cm$^2$ and 200 Hz.

Glass from the untreated furnace was completely unacceptable. There was no portion of the boule in which the fluorescence value was acceptably low. Glass from the treated furnace had acceptable glass to a depth of 3.53 inches. This represented 59.3% of the total depth.

The invention includes a method of producing a fused silica body by introducing a silicon-containing compound into a flame to form molten silica particles and collecting those particles in the form of a fused silica body in a furnace constructed of alumina refractory materials. The improvement includes collecting the silica particles in a furnace at least a portion of which has been exposed to a reactive, halogen-containing gas to react with, and thereby cleanse the refractory of contaminating metals.

The invention includes a method of making a fused silica glass. The method includes providing a silica feedstock, providing a furnace crown consisting essentially of aluminum dioxide with the crown covering a consolidating non-porous fused silica glass mass. The method includes delivering the silica feedstock to multiple reaction site burners mounted in the aluminum dioxide crown wherein the silica feedstock is converted into silica particles which are deposited and consolidated into the fused silica glass mass.

FIGS. 1–5 illustrate the inventive method of making a high purity fused silica glass. As shown in FIG. 1, a silica feedstock is provided from a feedstock source 12. Preferably the silica feedstock is delivered to burners 18 in a fluid vaporous state. The silica feedstock vapor is produced with a feedstock vaporizer with the vapors preferably delivered through conduits with the assistance of carrier gases such as nitrogen and oxygen. The method includes providing a furnace crown 20 which consists essentially of aluminum dioxide. The provided aluminum dioxide crown 20 covers a consolidating hot non-porous fused silica glass mass 24. The silica feedstock is delivered to multiple reaction site burners 18 which are mounted in the provided aluminum dioxide crown 20. The delivered feedstock is converted by the reaction flame/heat of the burners into fine silica soot particles 30 which are deposited on and consolidated into fused silica glass mass 24. The method preferably includes providing a cup 26 for containing and contacting silica glass 24 inside the furnace. Preferably furnace cup 26 consists essentially of aluminum dioxide. Preferably the provided silica feedstock is a high purity silica feedstock with a contaminating metal ion content less than 100 ppb and the consolidated fused silica glass mass has a contaminating metal ion content less than 100 ppb. Preferably the silica feedstock is a halide-free silica feedstock, most preferably a siloxane. In an alternative embodiment the silica feedstock is a halide containing feedstock which preferably is $SiCl_4$. In a preferred embodiment providing the silica feedstock includes providing a titanium dopant source and the fused silica glass mass is comprised of a titanium doped fused silica.

Figure 4:
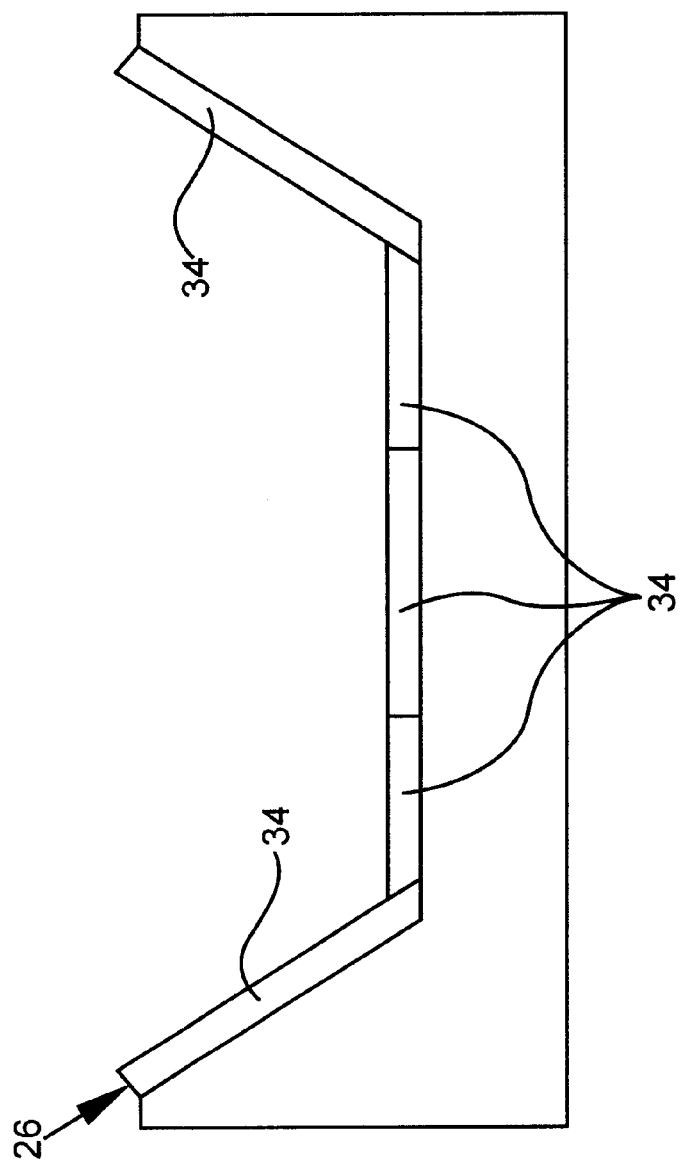
FIG. 4 is a cross-sectional view of a fused silica glass furnace cup in accordance with the invention.
Figure 5:
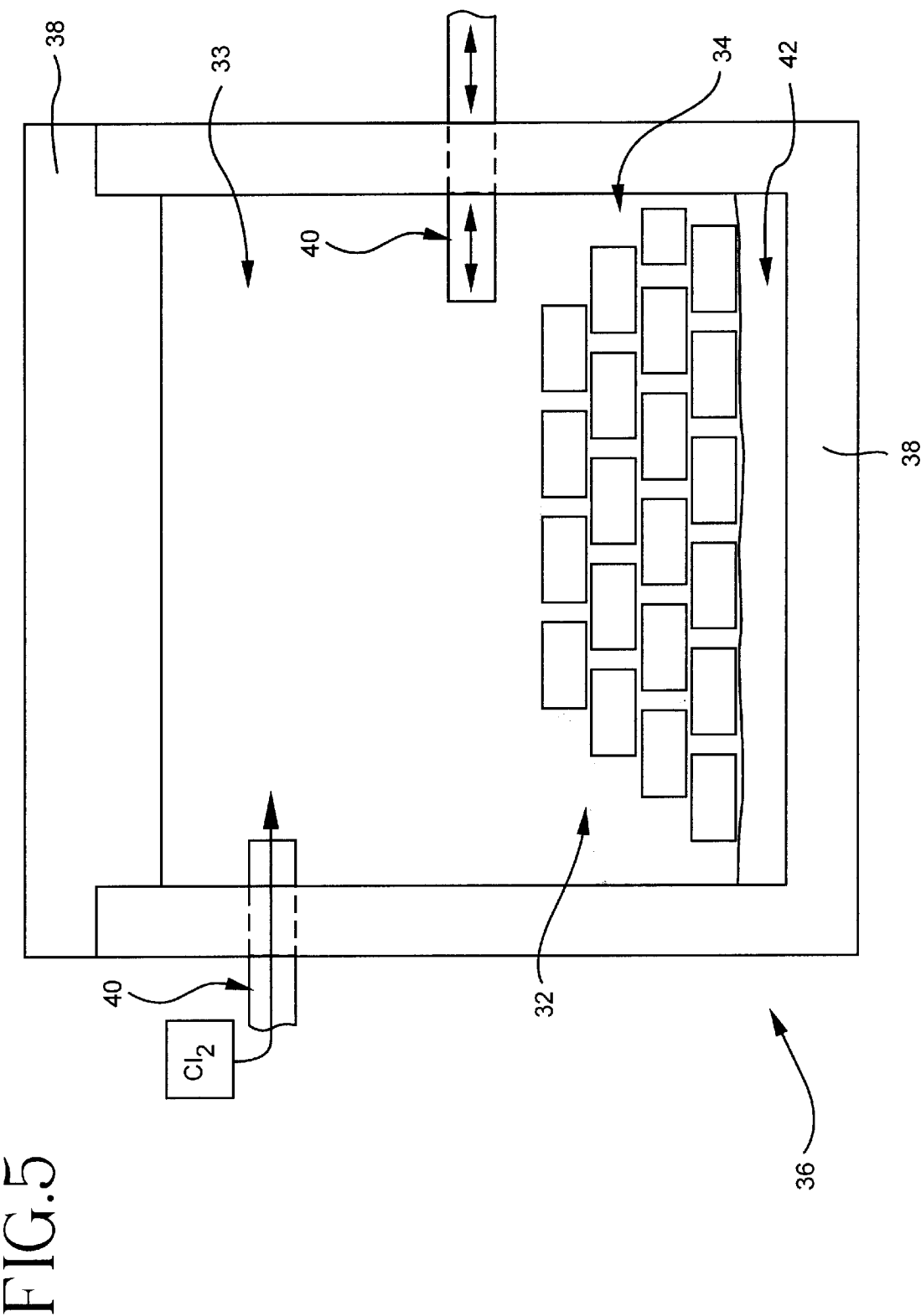
FIG. 5 illustrates a carbo-chlorination cleansing furnace and treatment process in accordance with the invention.

Providing aluminum dioxide crown 20 preferably includes providing non-Cl-treated aluminum dioxide refractory blocks 32 and exposing the non-Cl-treated aluminum dioxide refractory blocks 32 to a reactive halogen-containing gas 33. As shown in FIG. 5, refractory blocks 32 are treated with a reactive halogen-containing gas cleansing treatment to provide halogen treated cleansed refractory block members 34. The method preferably includes assembling halogen treated cleansed aluminum dioxide refractory blocks 34 to provide crown 20 consisting essentially of aluminum dioxide. Similarly providing aluminum dioxide cup 26 includes providing non-Cl-treated aluminum dioxide refractory members 32 and exposing the non-treated refractory members to the reactive halogen-containing gas 33 to provide halogen treated cleansed aluminum dioxide refractory members 34 which are then assembled to form cup 26 such as shown in FIG. 4, which consists essentially of aluminum dioxide. In the preferred embodiment of the method untreated aluminum dioxide refractory members 32 are provided by shaping and machining aluminum dioxide refractory preforms. The preforms are preferably formed/shaped into predetermined shapes and sizes that allow for their assembly into furnace crown 20 and cup 26. Preferably the preforms are machined into refractory members 32 with cutting saws and drills, and in an embodiment the aluminum dioxide refractories are wet machined. Such machining/shaping of the refractory members 32 is preferably performed prior to reactive halogen-containing gas cleansing treating most preferably with the cleansing treatment being the final manufacturing making process prior to assembly of cleansed brick members 34 into furnace cup 26 and crow 20 the preferred reactive halogen-containing gas cleansing treatment of the invention comprises carbo-chlorination purifying the refractory brick block members. As shown in FIG. 5, the refractory furnace members are treated in a carbo-chlorination treatment furnace 36. The carbo-chlorination treatment furnace 36 preferably is a graphite containment vessel 38 that has at least one vacuum/gas treatment inlet/outlet 40 that allows for a vacuum to be pulled within the sealed vessel 38 and allows for the controlled input and output of treatment gases such as chlorine, helium and hydrogen and mixtures thereof. Preferably the graphite treatment furnace vessel includes a particulate/powder carbon bed 42, such as a graphite carbon black powder so that an appropriate level of carbon is present in the furnace for carbo-chlorination of the refractory members. Treatment furnace 36 includes an appropriate heating source such as inductive heating elements or electrical resistive heating elements so that the interior and contents of vessel 38 can be heated to an elevated reaction temperature in the range of 1000 to 1500° C. and preferably at least 1200° C. to carbo-chlorinate the contents. In addition to removing impurities from the refractory members by reaction with the halogen chlorine agent, impurities are also treated and reacted with the elemental carbon in the furnace preferably with the carbon reducing metal contaminants in the refractories. A preferred carbo-chlorination cleaning treatment includes loading the refractory members into the treatment furnace along with the carbon bed. The furnace temperature is elevated to the preferred reaction temperature range of 1000 to 1500° C. (preferably at least 1200° C.) while a vacuum is pulled and maintained for a time that allows appropriate carbon reaction with oxides present, then a chlorine treatment gas is repeatedly fed into the vessel, preferably chlorine gas treatment exposures of about 30 to 60 minutes between chlorine feed in shots, preferably with 2 to 5 of the 30 to 60 minute exposures done at the elevated reaction temperature. The preferred chlorine gas treatment atmosphere is comprised of 2.5 to 20% $Cl_2$, more preferably 3 to 10% $Cl_2$, more preferably 4 to 8% $Cl_2$, an preferably about 6%±1% $Cl_2$, with the balance net of the treatment atmosphere helium. After such chlorine feed in shots a vacuum is pulled again while maintaining the temperature. In the preferred practice this carbo-chlorination treatment of vacuum-chlorine-vacuum is repeated at least one more time to ensure proper carbo-chlorination cleansing of the refractory members. After the final vacuum pulling treatment the treatment vessel and contents is preferably swept with a sweeping treatment gas such as helium or hydrogen. After the carbo-chlorination cleansing further processing and handling of the refractories members is minimized before assembling into the furnace, crown and cup. Preferred refractory members are provided by at least two carbo-chlorination treatments. The carbo-chlorinated refractory brick members of the invention provide high purity fused silica with UV transmission at KrF 248 nm of at least 99.9%/cm and at least 99.3%/cm at ArF 193 nm and achieves high purity fused silica with 99.7%+/cm at 193 nm.

As shown in FIGS. 1 and 4 the invention includes providing furnace cup 26 consisting essentially of aluminum dioxide and containing the consolidating non-porous fused silica glass mass 24 in the aluminum dioxide cup.

Preferably the aluminum dioxide crown and cup refractory members 34 are un-coated aluminum dioxide.

Preferably the aluminum dioxide crown and cup refractory members 34 are a silica free aluminum dioxide which are essentially free of Si and $SiO_2$. Most preferably the aluminum dioxide has a $SiO_2$ level less than 2000 ppm by weight.

Preferably providing the aluminum dioxide crown and cup refractory members 34 includes providing an unfired aluminum dioxide refractory precursor and firing the aluminum dioxide refractory precursor at a temperature of at least 1660° C. to provide a fired aluminum dioxide refractory member 34 and assembling the fired aluminum dioxide refractory member 34 to form and provide the furnace crown and cup. Preferably the aluminum dioxide refractory precursor is fired at a firing temperature of at least 1665° C., more preferably at least 1670° C., and most preferably at least 1675° C.

Figure 2:
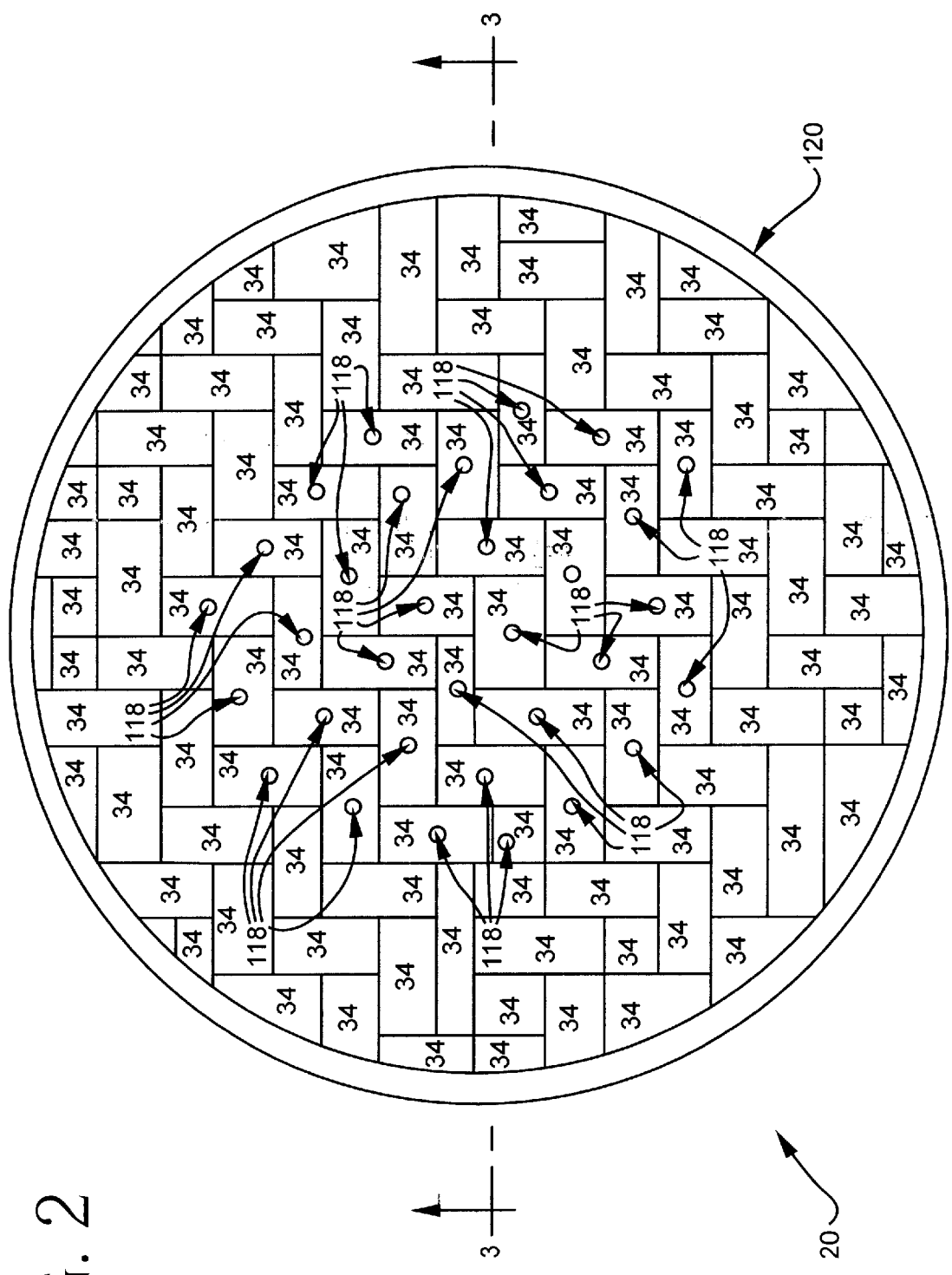
FIG. 2 is a top view of a fused silica glass furnace refractory arched dome crown in accordance with the invention.
Figure 3:
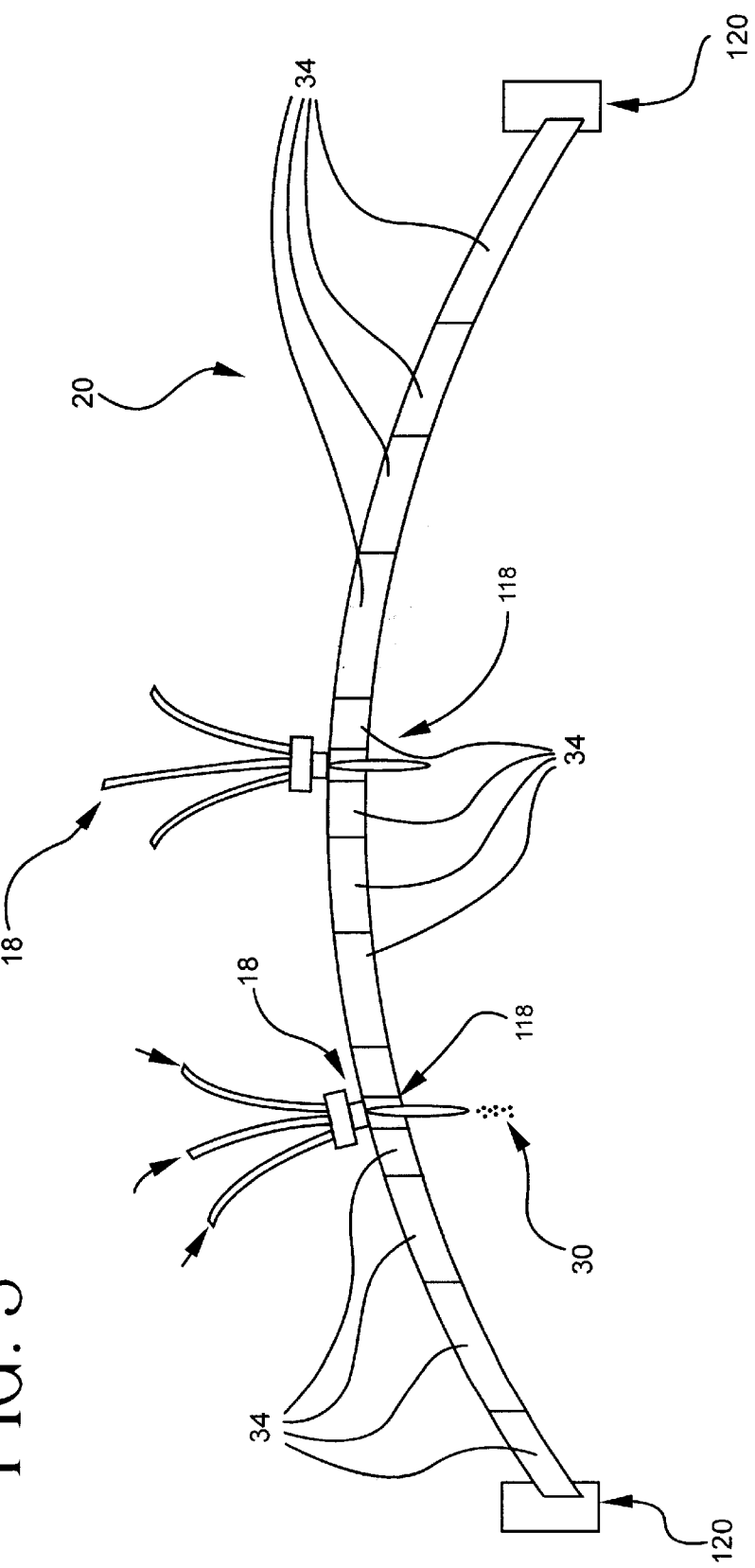
FIG. 3 is a cross-section view of the arched dome crown in accordance with the invention.

As shown in FIGS. 2–3, providing the aluminum dioxide crown preferably includes providing a plurality of porous aluminum dioxide refractory blocks and assembling the blocks into the crown, preferably having a porosity in the range of 25–70%. Preferably as shown in FIGS. 2–3, the aluminum dioxide crown 20 includes providing a plurality of aluminum dioxide refractory blocks 34 and assembling the blocks together to form an arched self-supporting dome crown. Preferably the aluminum dioxide crown 20 is comprised of aluminum dioxide refractory members 34 with a bulk density<3.9 grams/$cm^3$, more preferably ≦3 grams/$cm^3$, more preferably ≦2.5 grams/$cm^3$, more preferably ≦2 grams/$cm^3$ and ≦1.4 grams/$cm^3$. The aluminum dioxide refractory bulk density is preferably ≧1.2 grams/$cm^3$, with the range being about 1.2 to 3.8. Preferably providing the aluminum dioxide crown 20 includes providing an aluminum dioxide refractory with a Young's Modulus of at least $2 \times 10^6$ psi. in the temperature range of 20° C. to 1200° C. Preferably providing the aluminum dioxide crown 20 includes providing an aluminum dioxide refractory 34 with a creep percentage under a 25 psi load at 1600° C. for 150 hours of <5% creep, more preferably a creep percentage under a 25 psi load at 1600° C. for 150 hours of <2% creep, and most preferably a creep percentage under a 25 psi load at 1600° C. for 150 hours of ≦1.2% creep. Preferably the aluminum dioxide crown 20 has an emissivity<0.35 at a temperature of 1100° C.

The invention preferably includes avoiding deposition of the silica particles 30 on the crown 20. Depositing/coating of silica particles on the aluminum dioxide crown is avoided and inhibited, preferably by controlling the direction in which the soot stream of the burners 18 are focused and ensuring they are fixed in the crown.

The invention further includes terminating the delivery of silica feedstock to the burners 18, cooling the fused silica glass mass 24, disassembling the aluminum dioxide crown 20, and disposing of the disassembled aluminum dioxide crown blocks 34 which have a service temperature greater than 1300° C.

The invention further includes a fused silica glass furnace for converting a non-silica fluid silica precursor feedstock into a fused silica glass. The fused silica glass furnace 50 having a contained furnace interior 52, having a maximum furnace operation temperature MFOT, the furnace interior 52 including a conversion deposition consolidation site where the precursor feedstock is converted into silica soot, the converted silica soot then deposited and consolidated into a fused silica glass. The furnace interior site 52 contained and insulated by a plurality of aluminum dioxide refractory bricks 34, the aluminum dioxide refractory bricks 34 having a fired temperature FT, with FT>1650° C., and the aluminum dioxide refractory bricks consisting essentially of Al and O.

Preferably the aluminum dioxide refractory bricks 34 have a fired temperature FT with FT>MFOT+20° C. Preferably the aluminum dioxide refractory bricks 34 have a $SiO_2$ level less than 2000 ppm by weight. Preferably the aluminum dioxide refractory bricks 34 have a contaminating metal ion concentration less than 300 ppm, most preferably wherein the aluminum dioxide refractory bricks are Cl-treated cleansed carbo-chlorinated aluminum dioxide refractory bricks. Preferably the aluminum dioxide refractory bricks have a Na concentration≦100 ppm by weight, a K concentration≦20 ppm by weight, a Fe concentration ≦250 ppm by weight (preferably Fe≦150 ppm), preferably the aluminum dioxide refractory bricks 34 are micro-crack-free refractory bricks. Preferably the aluminum dioxide crown bricks 34 are assembled together to form a self-supporting arched dome covering the furnace interior 52. Preferably the aluminum dioxide cup bricks 34 are assembled together to form a cup container which contains the deposited consolidated fused silica glass, preferably with the glass in a flowing state inside the cup which is rotating.

The invention includes a fused silica glass furnace 50. The furnace 50 includes a self supporting arched dome crown 20, such as shown in FIG. 2 and the cross-section thereof in FIG. 3. The arched dome crown 20 is preferably comprised of interlocking aluminum dioxide refractory bricks 34. Preferably the refractory bricks 34 consists essentially of Al and O. Preferably the refractory bricks 34 have a bulk density in the range of 1.2 grams/cm$^3$ to 3 grams/cm$^3$. As shown in FIGS. 2–3 crown 20 has a plurality of burner holes 18 and a retaining ring 120 such as a steel metal ring structure for encircling crown 20 and maintaining the placement of bricks 34 in the arched dome structure during assembly/preparation of the furnace and while the crown rests on the foundation side walls of the furnace during furnace operation. Preferably the aluminum dioxide refractory bricks have a fired temperature greater than 1650° C. Preferably the refractory bricks 34 have a silica content less than 2000 ppm by weight, a Fe content less than 250 ppm by weight and a Na content less than 100 ppm by weight. Preferably the aluminum dioxide refractory crown bricks 34 have a Young's Modulus of at least 2×10$^6$ psi and a creep percentage under a 25 psi load at 1600° C. for 150 hours of less than 5% creep. Preferably the crown bricks 34 are assembled together in a herringbone pattern.

It will be apparent to those skilled in the art that various modifications and variations can be made to the present invention without departing from the spirit and scope of the invention. Thus, it is intended that the present invention covers the modifications and variations of this invention provided they come within the scope of the appended claims and their equivalents.

We claim:

1. An improved method of producing a fused silica body by introducing a silicon-containing compound into a flame to form molten silica particles and collecting those particles in the form of a fused silica body in a furnace constructed of alumina refractory materials, the improvement comprising:

collecting the silica particles in a furnace at least a portion of which has been pre-exposed to a reactive, halogen containing gas in the presence of elemental carbon to react with, and thereby cleanse the refractory of, contaminating metals.

2. A method of making a fused silica glass, said method including:

providing a silica feedstock, providing a crown consisting essentially of aluminum dioxide, said crown covering a consolidating non-porous fused silica glass mass, delivering said silica feedstock to a plurality of reaction site burners mounted with said aluminum dioxide crown wherein said silica feedstock is converted into a plurality of silica particles which are deposited and consolidated into said fused silica glass mass wherein providing said aluminum dioxide crown includes providing a plurality of non-Cl treated aluminum dioxide refractory blocks, exposing the non-Cl treated aluminum dioxide refractory blocks to a reactive halogen-containing gas cleansing treatment in the presence of elemental carbon to provide a plurality of halogen treated cleansed aluminum dioxide refractory blocks, and assembling said halogen treated cleansed aluminum dioxide refractory blocks to form and provide said crown consisting essentially of aluminum dioxide.

3. A method of making a fused silica glass, said method including:

providing a silica feedstock, providing a crown consisting essentially of aluminum dioxide, said crown covering a consolidating non-porous fused silica glass mass, delivering said silica feedstock to a plurality of reaction site burners mounted with said aluminum dioxide crown wherein said silica feedstock is converted into a plurality of silica particles which are deposited and consolidated into said fused silica glass mass, said method including providing a cup consisting essentially of aluminum dioxide and containing said consolidating non-porous fused silica glass mass in said aluminum dioxide cup wherein providing said aluminum dioxide cup includes providing a plurality of non-Cl treated aluminum dioxide refractory members, exposing the non-Cl treated aluminum dioxide refractory members to a reactive halogen-containing gas cleansing treatment in the presence of elemental carbon to provide a plurality of halogen treated cleansed aluminum dioxide refractory members, and assembling said halogen treated cleansed aluminum dioxide refractory members to form and provide said cup consisting essentially of aluminum dioxide.

4. A method of making a fused silica glass, said method including:

providing a silica feedstock, providing a crown consisting essentially of aluminum dioxide, said crown covering a consolidating non-porous fused silica glass mass, delivering said silica feedstock to a plurality of reaction site burners mounted with said aluminum dioxide crown wherein said silica feedstock is converted into a plurality of silica particles which are deposited and consolidated into said fused silica glass mass, wherein providing said aluminum dioxide crown includes providing an unfired aluminum dioxide refractory precursor and firing said aluminum dioxide refractory precursor at a temperature of at least 1660° C. to provide a fired aluminum dioxide refractory of bulk density in the range of 1.2 to less than 3.9 grams/cm$^3$, and assembling said fired aluminum dioxide refractory to form and provide said crown.

5. A method as claimed in claim 4, wherein said aluminum dioxide refractory precursor is fired at a firing temperature of at least 1665° C.

6. A method as claimed in claim 4, wherein said aluminum dioxide refractory precursor is fired at a firing temperature of at least 1670° C.

7. A method as claimed in claim 4, wherein said aluminum dioxide refractory precursor is fired at a firing temperature of at least 1675° C.

8. A method of making a fused silica glass, said method including:

providing a silica feedstock, providing a crown consisting essentially of aluminum dioxide, said crown covering a consolidating non-porous fused silica glass mass, delivering said silica feedstock to a plurality of reaction site burners mounted with said aluminum dioxide crown wherein said silica feedstock is converted into a plurality of silica particles which are deposited and consolidated into said fused silica glass mass, wherein providing said aluminum dioxide crown includes providing an aluminum dioxide refractory with a bulk density in the range of 1.2 to less than 3.9 grams/cm$^3$.

9. A method as claimed in claim 8, wherein providing said aluminum dioxide crown includes providing a aluminum dioxide refractory with a bulk density≦3 grams/cm$^3$.

10. A method as claimed in claim 8, wherein providing said aluminum dioxide crown includes providing a aluminum dioxide refractory with a bulk density≦2.5 grams/cm$^3$.

11. A method as claimed in claim 8, wherein providing said aluminum dioxide crown includes providing a aluminum dioxide refractory with a bulk density≦2 grams/cm$^3$.

12. A method as claimed in claim 8, wherein providing said aluminum dioxide crown includes providing a aluminum dioxide refractory with a bulk density≦1.4 grams/cm$^3$.

13. A method of making a fused silica glass, said method including:
providing a silica feedstock,
providing a crown consisting essentially of aluminum dioxide, said crown covering a consolidating non-porous fused silica glass mass,
delivering said silica feedstock to a plurality of reaction site burners mounted with said aluminum dioxide crown wherein said silica feedstock is converted into a plurality of silica particles which are deposited and consolidated into said fused silica glass mass,
wherein providing said aluminum dioxide crown includes providing an aluminum dioxide refractory with a Young's Modulus of at least 2×10$^6$ psi and a contaminating metal concentration of less than 300 ppm, such contaminating metals including Na, K, alkaline earth metals, transition metals and mobile metal contaminants which degrade the UV optical transmission of glass.

14. A method of making a fused silica glass, said method including:
providing a silica feedstock,
providing a crown consisting essentially of aluminum dioxide, said crown covering a consolidating non-porous fused silica glass mass,
delivering said silica feedstock to a plurality of reaction site burners mounted with said aluminum dioxide crown wherein said silica feedstock is converted into a plurality of silica particles which are deposited and consolidated into said fused silica glass mass wherein providing said aluminum dioxide crown includes providing an aluminum dioxide refractory with a creep percentage under a 25 psi load at 1600° C. for 150 hours of <5% creep and a contaminating metal concentration of less than 300 ppm, such contaminating metals including Na, K, alkaline earth metals, transition metals and mobile metal contaminants which degrade the UV optical transmission of glass.

15. A method as claimed in claim 14, wherein providing said aluminum dioxide crown includes providing an aluminum dioxide refractory with a creep percentage under a 25 psi load at 1600° C. for 150 hours of ≦2% creep.

16. A method as claimed in claim 14, wherein providing said aluminum dioxide crown includes providing an aluminum dioxide refractory with a creep percentage under a 25 psi load at 1600° C. for 150 hours of ≦1.2% creep.

17. A method as claimed in claim 2, further including, terminating said delivery of silica feedstock to said burners, cooling said fused silica glass mass, disassembling said aluminum dioxide crown blocks, and disposing of a plurality of said blocks which have a service temperature greater than 1300° C.

18. A method of producing a fused silica body by introducing a silicon-containing compound into a flame to form molten silica particles and collecting those particles in the form of a fused silica body in a furnace constructed of refractory materials, said method including collecting the silica particles in the furnace wherein said furnace is comprised of a plurality of carbo-chlorinated cleansed refractory members.

19. A method in accordance with claim 18 in which the carbo-chlorinated cleansed refractory members are comprised of zirconium.

20. A method in accordance with claim 18 in which the carbo-chlorinated cleansed refractory members are comprised of aluminum.

21. A method in accordance with claim 18 in which the carbo-chlorinated cleansed refractory members are formed into an arched dome crown.

\* \* \* \* \*